US00RE42680E

(19) United States
(12) Reissued Patent
Hilfiker et al.

(10) Patent Number: US RE42,680 E
(45) Date of Reissued Patent: Sep. 6, 2011

(54) COMPRESSIBLE WELDED WIRE WALL FOR RETAINING EARTHEN FORMATIONS

(75) Inventors: Harold K. Hilfiker, Eureka, CA (US); William B. Hilfiker, Fortuna, CA (US)

(73) Assignee: Hilfiker Pipe Company, Eureka, CA (US)

(21) Appl. No.: 10/799,492

(22) Filed: Mar. 12, 2004

Related U.S. Patent Documents

Reissue of:
(64) Patent No.: 6,357,970
Issued: Mar. 19, 2002
Appl. No.: 09/568,338
Filed: May 10, 2000

(51) Int. Cl.
*E02D 17/20* (2006.01)

(52) U.S. Cl. ..... 405/302.7; 405/262; 405/284; 405/302.4; 405/302.6

(58) Field of Classification Search ..... 405/262, 405/284, 302.4, 302.6, 302.7
See application file for complete search history.

(56) References Cited

U.S. PATENT DOCUMENTS

| | | | | |
|---|---|---|---|---|
| 4,117,686 | A | 10/1978 | Hilfiker | 405/284 |
| 4,329,089 | A | 5/1982 | Hilfiker et al. | 405/262 |
| 4,391,557 | A | 7/1983 | Hilfiker et al. | 405/287 |
| 4,505,621 | A | 3/1985 | Hilfiker et al. | 405/284 |
| 4,643,618 | A | 2/1987 | Hilfiker et al. | 405/287 |
| 4,856,939 | A | 8/1989 | Hilfiker et al. | 405/284 |
| 5,531,547 | A | 7/1996 | Shimada | 405/262 |
| 5,622,455 | A | 4/1997 | Anderson et al. | 405/262 |
| 5,722,799 | A | 3/1998 | Hilfiker | 405/262 |
| 5,733,072 | A | 3/1998 | Hilfiker et al. | 405/284 |

FOREIGN PATENT DOCUMENTS

| | | |
|---|---|---|
| FR | 75 07114 | 10/1976 |
| FR | N 75 07114 | 10/1976 |

OTHER PUBLICATIONS

Barry R. Christopher, etc., "The Heavy Duty Geogrid Wall," *Civil Engineering,* May 1988, pp. 75-77.

*Primary Examiner* — Gary Hartmann
(74) *Attorney, Agent, or Firm* — Dergosits & Noah LLP

(57) ABSTRACT

An improved method and apparatus for constructing a soil reinforced earthen retaining wall wherein successive soil reinforcing mats embedded within an earthen formation have bent-up face elements which are slidably engaged to enable the earthen formation to settle without bulging the face elements. Backing mats are disposed behind the face elements for movement relative thereto in generally vertical planes. The backing mats serve to support the successive soil reinforcing mats and permit the mats to more toward one another to accommodate settling of the formation without bulging of the face elements.

21 Claims, 8 Drawing Sheets

COMPRESSIBLE WELDED WIRE WALL FOR RETAINING EARTHEN FORMATIONS

Matter enclosed in heavy brackets [ ] appears in the original patent but forms no part of this reissue specification; matter printed in italics indicates the additions made by reissue.

BACKGROUND OF THE INVENTION

The present invention relates to the retention of earthen formations and, more particularly, is concerned with a retaining and reinforcing mechanism made up of welded wire mats having face sections which are secured to one another. In its more specific aspects, the invention is concerned with an improved method and apparatus which accommodates settling of the earthen formation, without bulging of the face sections of the wall.

The prior art relating to the present invention is exemplified by U.S. Pat. No. 4,117,686 to William K. Hilfiker. That patent discloses a method and apparatus for constructing retaining walls from welded wire gridworks of the type with which the present invention is concerned. In the structure of the patent, the face sections of the gridworks are secured together, either through means of separate ties, or by plastically deforming the distal wires of the face sections as the wall is erected. Another form of wire retention wall may be seen in French patent 7,507,114, published Oct. 1, 1976. In the structure of that patent, the wire trays have U-shaped face sections which are superimposed upon one another and, in at least some instances, secured together with wire ties. Other patents of interest to various techniques which have been provided for securing the face sections of compressible welded wire retaining walls together are William K. Hilfiker U.S. Pat. Nos. 4,505,621, 4,856,939, 5,722,799 and 5,733,072.

SUMMARY OF THE INVENTION

The present invention provides a welded wire reinforced soil retaining wall where the horizontal soil reinforcing elements may move toward one another in response to the settling of an earthen formation, without bulging of the face sections. This is achieved by securing the successive face sections of the wall in slidable engagement with one another and supporting the soil reinforcing mats on backing mats which are free to move vertically, without bulging. The face sections of the reinforcing mats of the present invention have no cross wires which are engaged as the fill compacts. The successive face sections hold one another against outward displacement, without bulging. In one embodiment, extensions on the successive face sections serve both to secure the sections in slidable engagement with one another and to secure the backing mats against outward displacement, while permitting the reinforcing mats to settle. In another embodiment, the backing mats for each successive face section have extensions which slidably engage the next successive backing mat to hold it against outward displacement. Releasable connectors secure the backing mats to the face sections of the soil reinforcing mats to facilitate erection of the wall, while permitting the backing mats to release to accommodate settling of the fill in the retained earthen formation.

A principal object of the invention is to provide a soil reinforced retaining wall utilizing welded wire soil reinforcing elements having face sections which can accommodate settling of the retained earthen formation, without bulging.

Another object of the invention is to provide such a wall in which the face maintains its integrity and aesthetic appearance, even where settlement of the earthen formation takes place.

Still another object of the invention is to provide such a wall which will adapt to the settlement of a retained earthen formation which frequently occurs as the result of inadequate compaction of fill and/or poor fill quality.

Yet another object of the invention is to provide such a wall in which the soil reinforcing elements are securely held together during erection of the wall, while still permitting relative movement of the elements in response to settlement of the earthen formation being retained.

Still another and more specific object is to provide such a wall wherein the number of components and their complexity is no greater than that of other soil enforced wire walls presently in use.

Another object is to provide such a wall which maintains its integrity throughout its life.

These and other objects will become more apparent when viewed in light of the accompanying drawings and following detailed description.

DESCRIPTION OF THE PREFERRED EMBODIMENTS

First Embodiment

Figure 1:
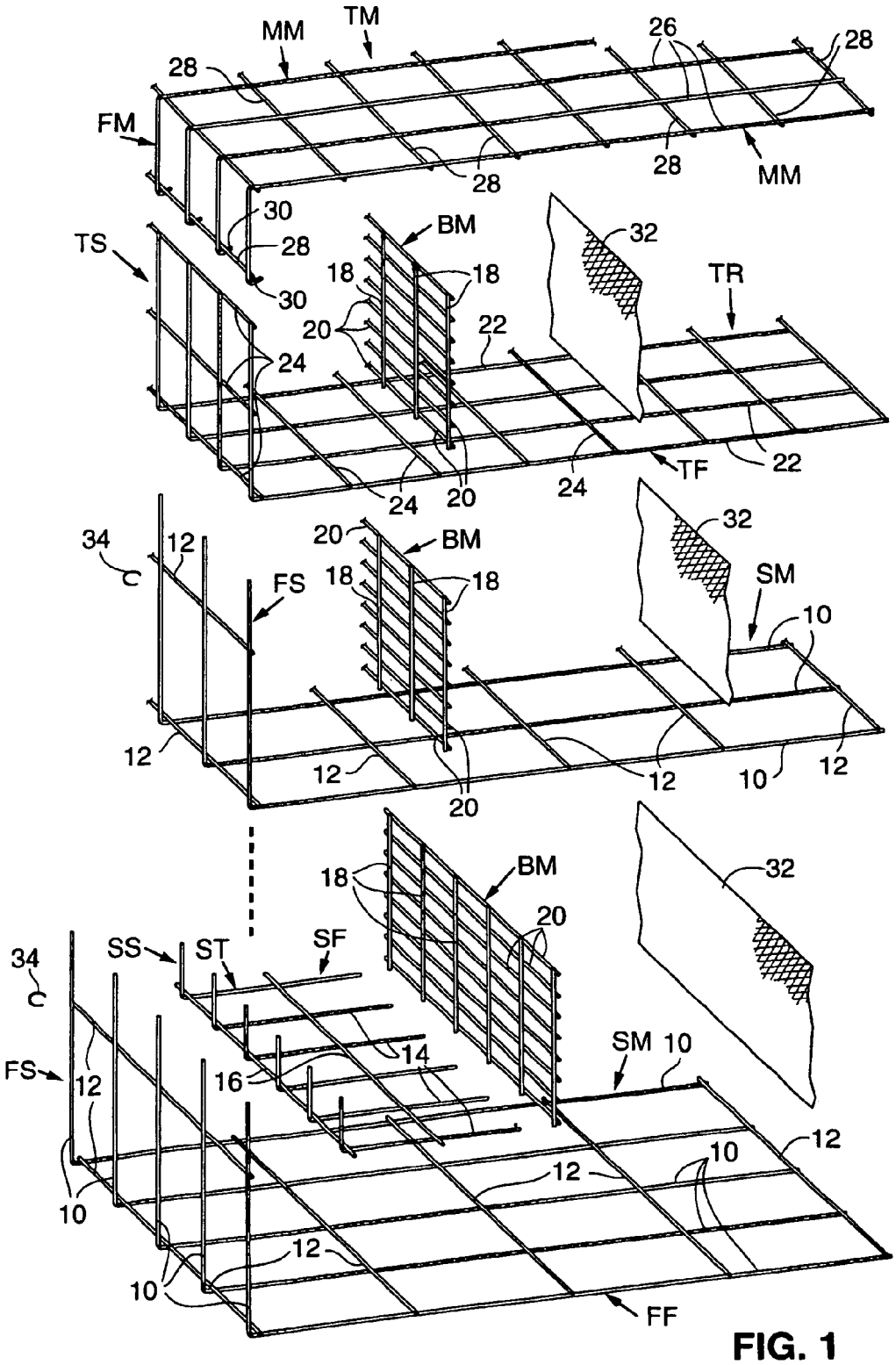
FIG. 1 is an exploded perspective view of a first embodiment of the invention, illustrating the components which would be used to construct a soil reinforced wall having three lifts.

Referring now to FIG. 1, the basic elements are soil reinforcing mat SM, backing mat BM, stiffening mat ST, and top mat TM. These mats are of welded wire construction and typically constructed of W3.5 to W12 wire welded together at their intersections and coated with a suitable anti-corrosive coating, such as zinc. Mat SM has a face section FS and a floor section FF disposed at right angles relative to one another and comprised of longitudinal wires 10 and intersecting transverse wires 12. Typical spacing is 8 inches for the longitudinal wires 10 and 21 inches for the transverse wires 12. The length of the floor section FF is determined by the depth of the formation being reinforced. The height of the face section FS is typically 31 inches, with 21 inches being the distance from the intersection of the floor and face sections to the transverse wire 12 of the face section and 10 inches being the length of the free distal end of the face section above the transverse wire therein.

The stiffening mat ST has floor and face sections SF and SS and is comprised longitudinal wires 14 and transverse 16 welded together at their intersections. Typical spacing is 6 inches for the longitudinal wires and 12 inches for the transverse wires, with the face section SS having the height of 7 inches and the floor section SF having a length of 23½ inches.

The backing mat BM is of generally planer configuration and comprises longitudinal wires 18 and transverse wires 20 welded together at their intersections. Typical spacing is 8 inches for the longitudinal wires and 3 inches for the transverse wires.

The top soil reinforcing mat TR is of a modified construction, as compared to the mat SM. Mat TR has a face section TS and a floor section TF. The mat TR is comprised of longitudinal wires 22 and transverse wires 24 welded together at their intersections. Typical spacing for the longitudinal wires is 6 inches and for the transverse wires is 12 inches. The length of the floor section TF is determined by the depth of the formation being reinforced. The face section TS terminates at one of the transverse wires 24 and typically has a height of approximately 24 inches.

The longitudinal and transverse wires of the top mat TM are designated by the numerals 26 and 28, respectively, and have the same spacing as those of the top reinforcing mat TR. The mat TM has a face section FM disposed at right angles relative to its floor section MM. The face section terminates at a transverse wire 28, with distal ends of the longitudinal wires 26 being bent inwardly to form hooks 30.

The components of the wall are completed by filter mats 32 formed of conventional filter fabric. These mats are cut to compliment the shape of the backing mats BM.

Figure 2A:
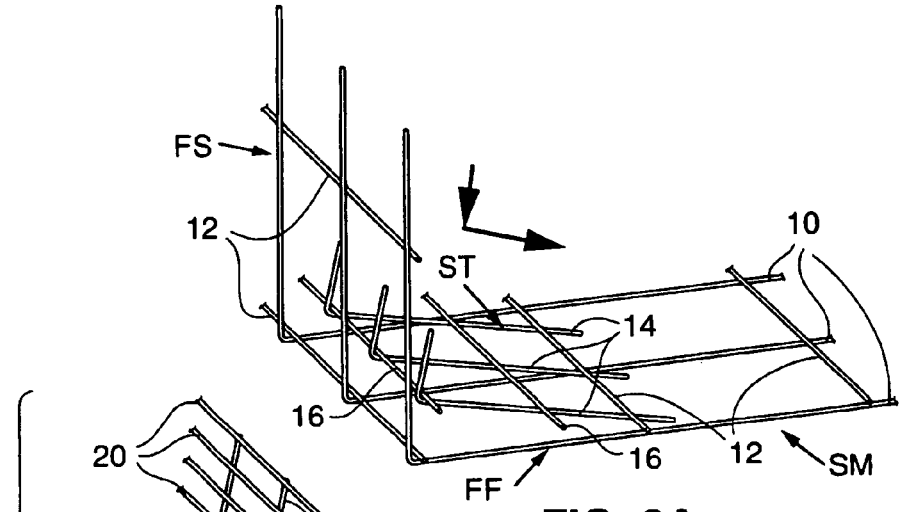
FIGS. 2A, 2B and 2C are perspective views illustrating the sequence of assembling the components of the first embodiment of the invention in the construction of the lowermost lift.
Figure 2B:
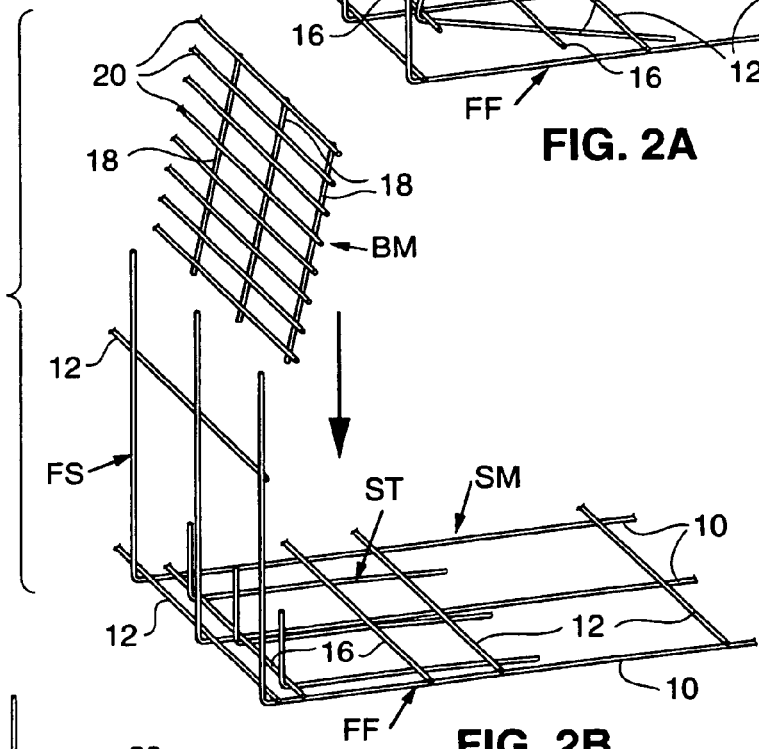
Figure 2C:
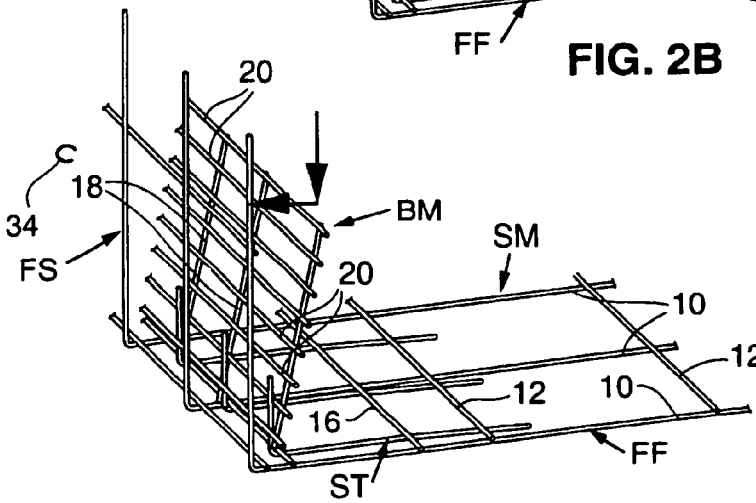
Figure 3:
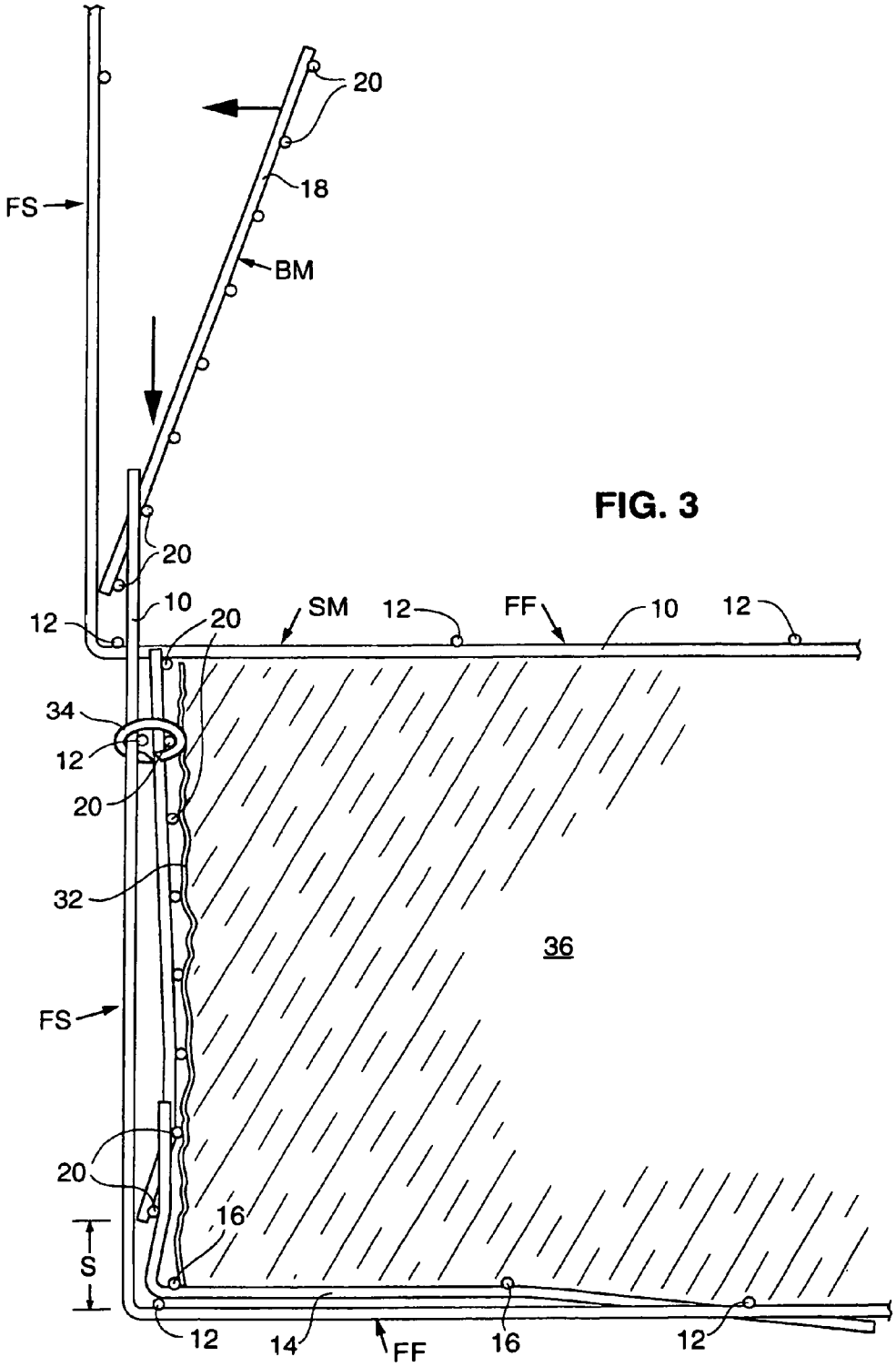
FIG. 3 is an elevational view showing the first embodiment of the invention in the construction of a soil reinforced wall, with the first lift complete and the second lift in the first stage of assembly.

The assembly sequence for the lowermost lift is illustrated in FIGS. 2A to 2C. First the stiffening mat ST is tilted into place as shown in FIG. 2A to engage the longitudinal wires 14 beneath the transverse wire 12. Then the stiffening mat ST is swung downwardly so that the upwardly extending ends of the longitudinal wires 14 are positioned behind and closely adjacent the face section FS, as seen in FIG. 2B. Next the backing mat BM is threaded over the upwardly extending distal ends of the wires 14 so that the wires 14 extend between the lowermost transverse wires 20 of the backing mat. The backing mat is then tilted forwardly as seen in FIG. 2C to the generally vertical orientation seen in FIG. 3. The backing mat is deliberately positioned so that its lower extremity is positioned above the floor section SF of the reinforcing mat SM by a dimension "s" of approximately three inches. The uppermost transverse wire 12 of the face section FS is then connected to an adjacent transverse wire 20 of the backing mat BM by hog ring 34, as shown in FIG. 3. With the components of the lower lift so assembled, the filter mat 32 is then placed to the back of the backing mat BM and fill 36 is backfilled into the first lift and compacted to the level of the uppermost transverse wire 20 of the backing mat, as seen in FIG. 3.

With the backfill of the first lift in place, the components of the second lift are then assembled over those of the first lift, as shown in FIG. 3. The first step of this process is to position the soil reinforcing mat SM of the second lift on top of the backfill 36 of the first lift, with the floor section FF resting on the uppermost wire 20 of the lower lift backing mat BM and the foremost transverse wire 12 of the second lift soil reinforcing mat immediately to the front of the upwardly extending longitudinal wires 10 of the lower lift soil reinforcing mat. In the later condition, the foremost wire 12 of the second lift soil reinforcing mat serves to hold the facing mat of the lowermost lift against outward displacement.

The next step of assembly for the second lift is to thread a backing mat BM over the upwardly extending ends of the longitudinal wires 10 of the lower lift soil reinforcing mat so that the wires 10 pass between the lowermost adjacent transverse wires 20, as seen FIG. 3. The backing mat of the second lift is then tilted forwardly and secured to the face section FS of the second lift soil reinforcing mat by a hog ring 34 (see FIG. 4). A filter mat 32 is then positioned behind the backing mat BM of the second lift and backfill soil is then filled into and compacted into the second lift, as seen FIG. 5, to the level of the uppermost transverse wire 20 of the second lift backing mat.

Figure 5:
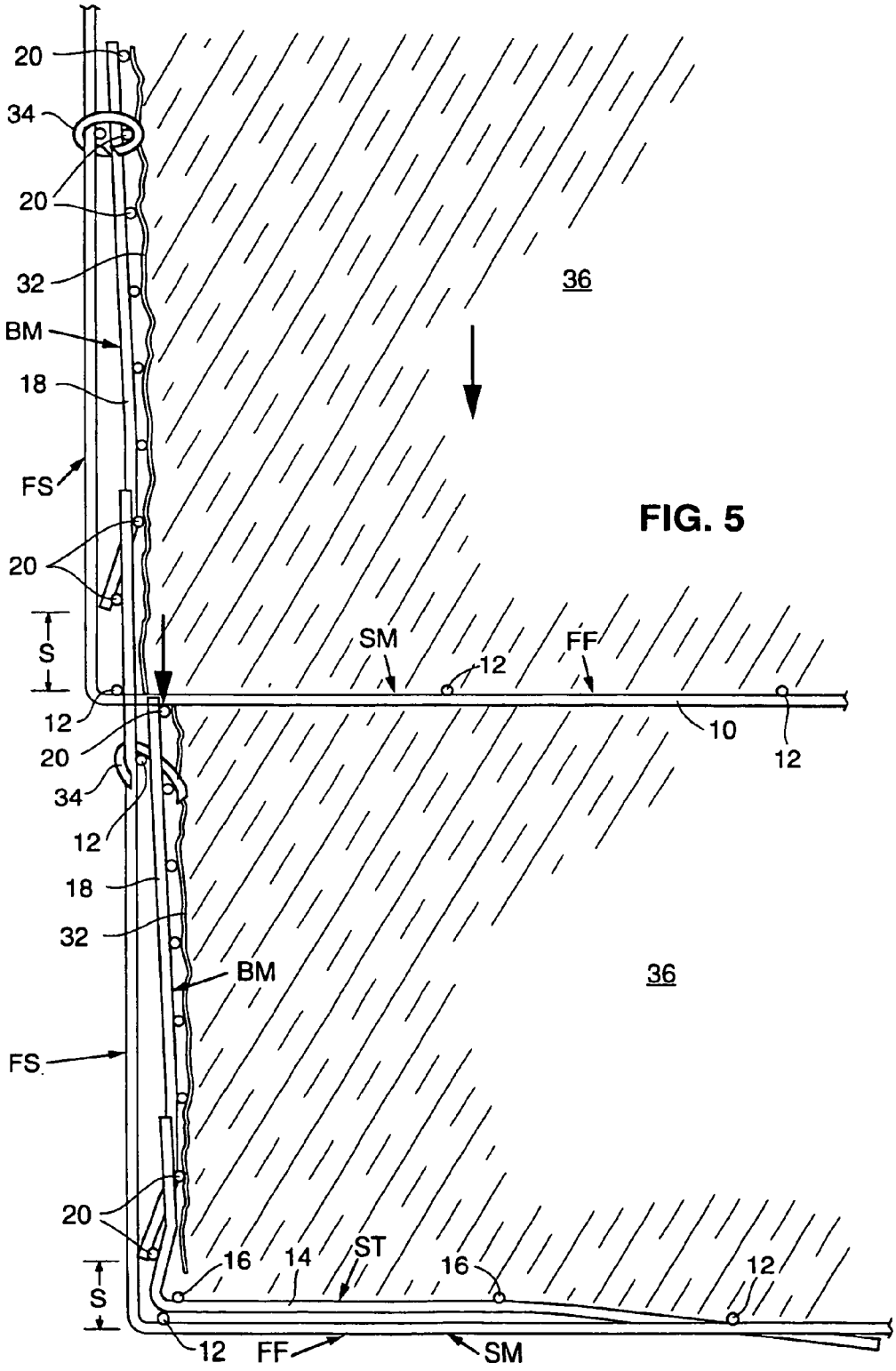
FIG. 5 is an elevational view similar to FIG. 4, illustrating the wall with backfill in place in the first and second lifts.
Figure 6:
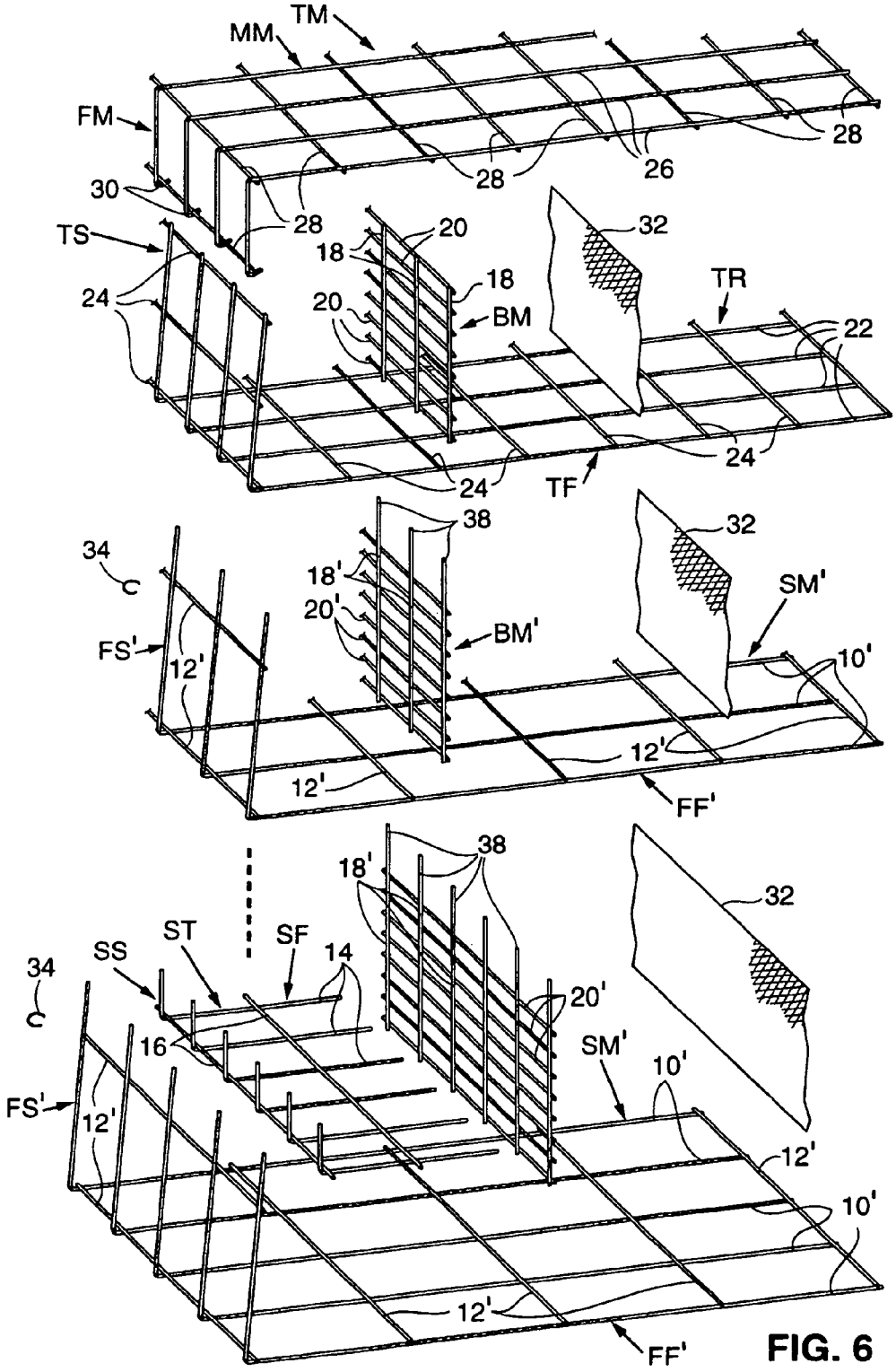
FIG. 6 is an exploded perspective view of the components of the second embodiment of the invention, as they would appear in the construction of a retaining wall having three lifts.

FIG. 5 shows the backfill compacted and settled to the extent that it has forced the backing mat BM of the lower lift downwardly. As this occurs, the backing mat BM of the lower lift slides downwardly on upwardly extending longitudinal wires of the stiffening mat ST, and the dimension "s" is reduced. At the same time, the hog ring 34 for the lower lift is stretched to an open condition, as seen in FIG. 5. All of the later compaction is accommodated by sliding of the lower lift backing mat BM on the upwardly extending wires 14 of the stiffening mat ST, without bulging of the face of the lower lift.

Figure 4:
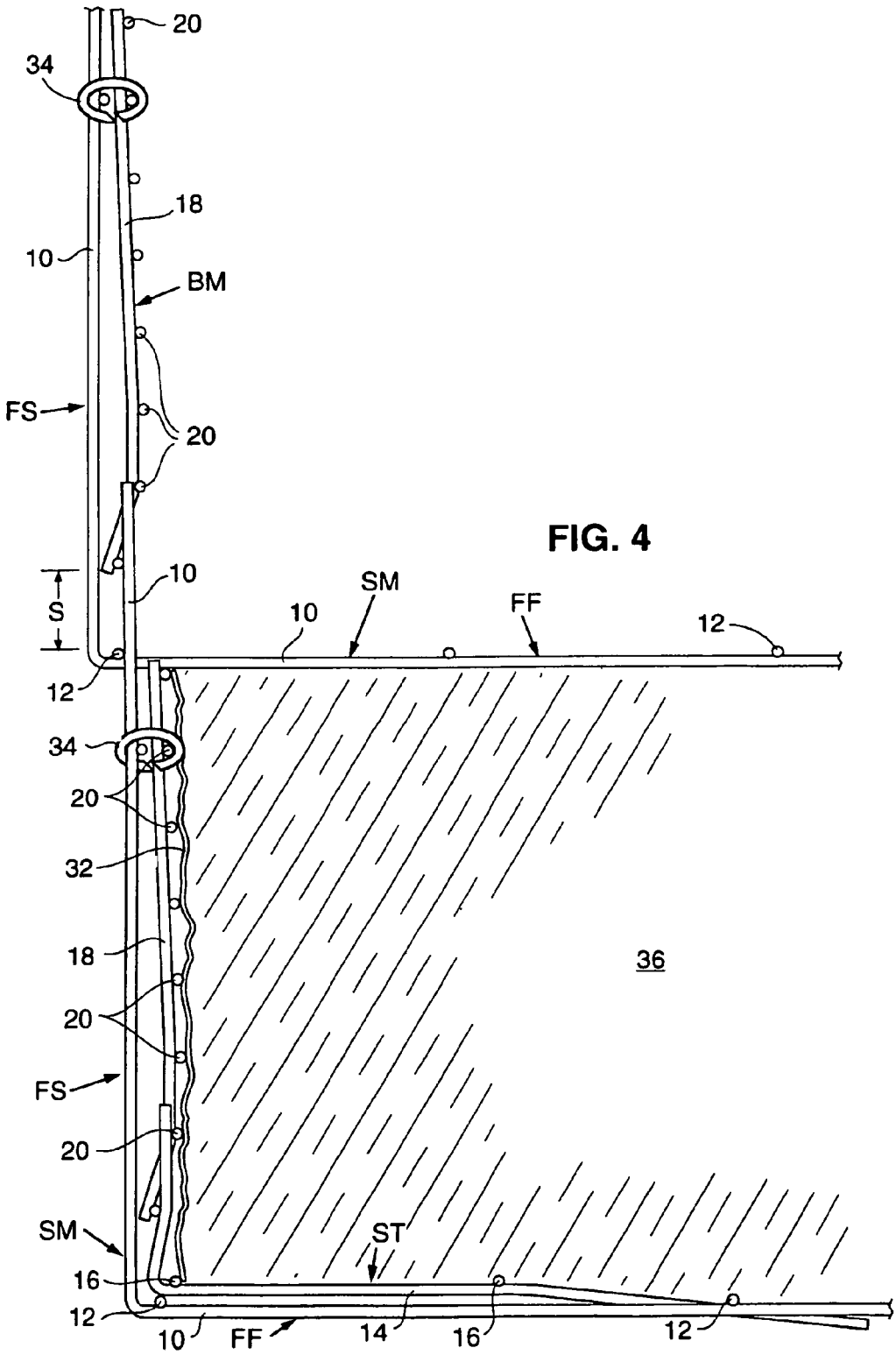
FIG. 4 is an elevational view similar to FIG. 3, illustrating the first embodiment with the components of the second lift fully assembled and ready for backfill.

Assembly of the second lift is completed by sliding the second lift backing mat BM over the upwardly extending distal wires 10 of the lower lift face mat FS to an extent such that the lower extremity of the second lift backing mat BM is spaced from the floor section FF of the second lift soil reinforcing mat by a dimension "s" of approximately 3 inches and then swinging the second lift backing mat BM forwardly and fastening it in place with a hog ring 34, as seen in FIG. 4. A filter mat 32 is then placed behind the second lift backing mat BM and the second lift is then back-filled with fill 36 (see FIG. 5). Successive additional lifts corresponding to the second lift may be constructed above the second lift to form a retaining wall of whatever height desired. Each of these successive lifts would correspond to the second lift. As each successive lift is compacted and settles into place, it may bear on the lift there below and settle similarly to the settlement of the lift depicted at the bottom of FIG. 5. During the course of such settlement, the backing mats of the successive lifts may slide down over the dimension "s" to accommodate settlement, without bulging of the face of the retaining wall.

Construction of the retaining wall is completed by forming the top lift of the wall through means of the top reinforcing mat and TR and associated backing mat BM and filter mat 32 seen at the top of FIG. 1. Assembly of these elements would corresponds to that of the first and second lifts, with the mat BM of the top lifts spaced above the floor section TF of the reinforcing mat TR by a dimension "s" to accommodate settlement of the soil in the top lift, without bulging of the retaining wall face. The top lift is completed by placing the top mat TM over the lift with the hooks 30 hooked over the uppermost transverse wire 24 of the reinforcing mat TR. Covering soil is then placed over the top mat TM.

Second Embodiment

The second embodiment differs from the first embodiment only in that the elements used to form the lower lifts are of a slightly different construction. The elements to form the topmost lift are of a construction identical to that of the first embodiment, as may be seen from the upper portion of FIG.

6. The stiffening mats ST and filter mats 32 of the second embodiment are also identical to the corresponding elements of the first embodiment.

The elements of the second embodiment which are the same as those of the first embodiment are designated by like numerals and letters. The elements of the second embodiment which correspond to those of those of the first embodiment, but are somewhat modified, are designated by the same letters and numerals of the first embodiment, followed prime marks as follows:

| | |
|---|---|
| BM' | backing mat |
| FF' | floor section |
| FS' | face section |
| SM' | soil reinforcing mat |
| 10' | longitudinal wires |
| 12' | transverse wires |
| 18' | longitudinal wires |
| 20' | transverse wire |

The elements of the lowermost lift of the second embodiment are assembled in a manner corresponding identically to those of the elements of the first lift. This may be seen from FIG. 7 wherein the elements are shown in fully assembled condition with the soil reinforcing mat SM' at the bottom and the stiffening mat ST engaged thereover and extending between the lowermost pair of transverse wires 20' of the backing mat BM'. The backing mat BM' is positioned so that its lower extremity is above the floor section FF' by a dimension "s" of approximately three inches. A hog ring 34 extends around transverse wires 12' and 20' of the soil reinforcing mat SM' and backing mat BM' to hold the backing mat BM' to the face section FS'.

Figure 7:
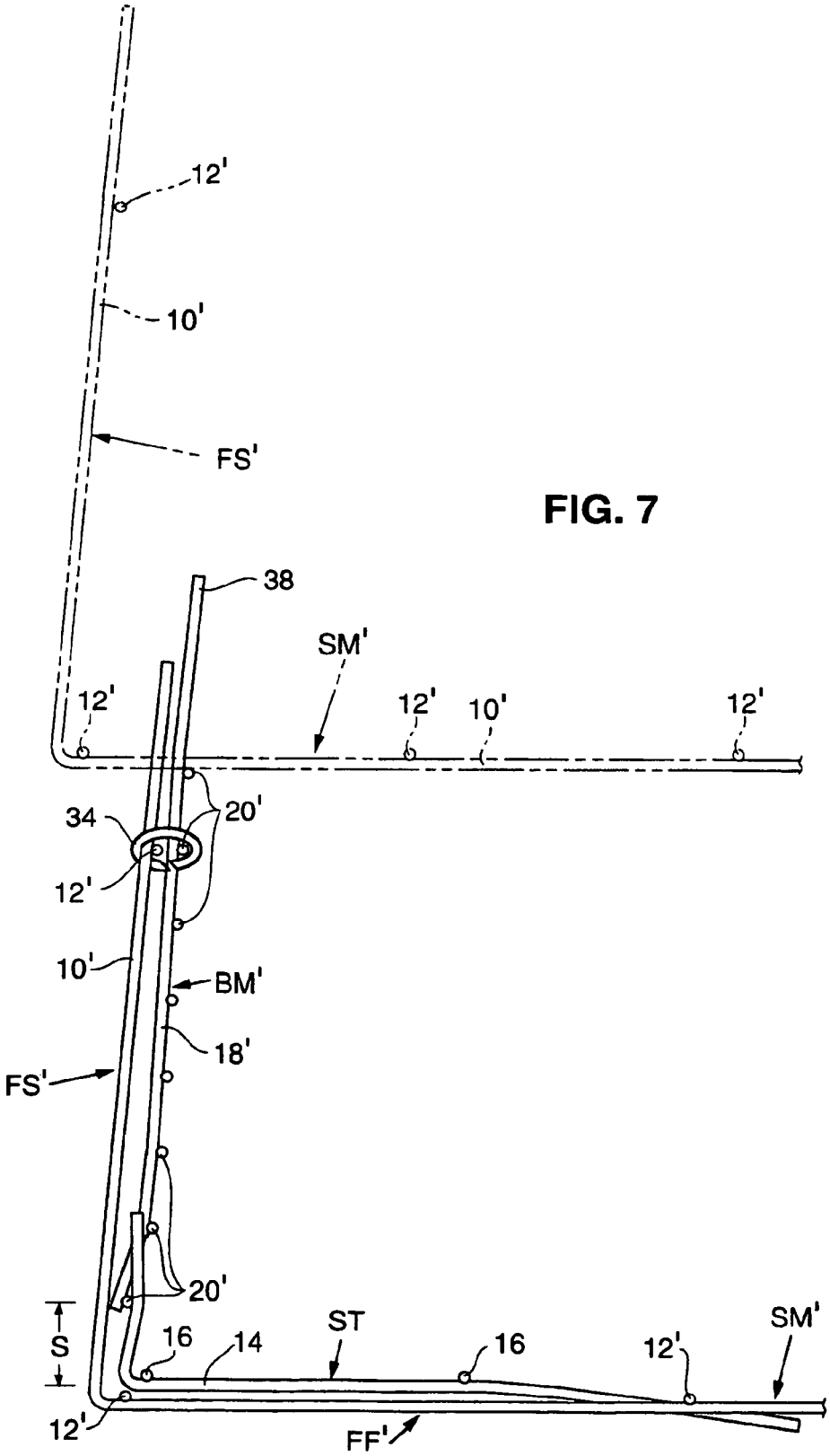
FIG. 7 is an elevational view of a retaining wall in the process of being constructed with the second embodiment of the invention, illustrating the components for the first lift fully assembled and in condition to receive backfill, with a phantom line representation showing the soil reinforcing mat of the second lift.

The differences between the first and second embodiments can be best seen from a comparison of FIGS. 4 and 7. This shows that the upper distal ends of the longitudinal wires 10' in the face section FS' of the second embodiment are relatively short, as compared to those of the first embodiment and that the longitudinal wires 18' of the second embodiment backing mat BM' extend upwardly to provide free distal ends 38 above the uppermost transverse wire 20' of the backing mat. As a result of this difference in construction, the distal ends 38 of the backing mats BM' extend upwardly beyond the distal ends of the longitudinal wires 10'.

Figure 8:
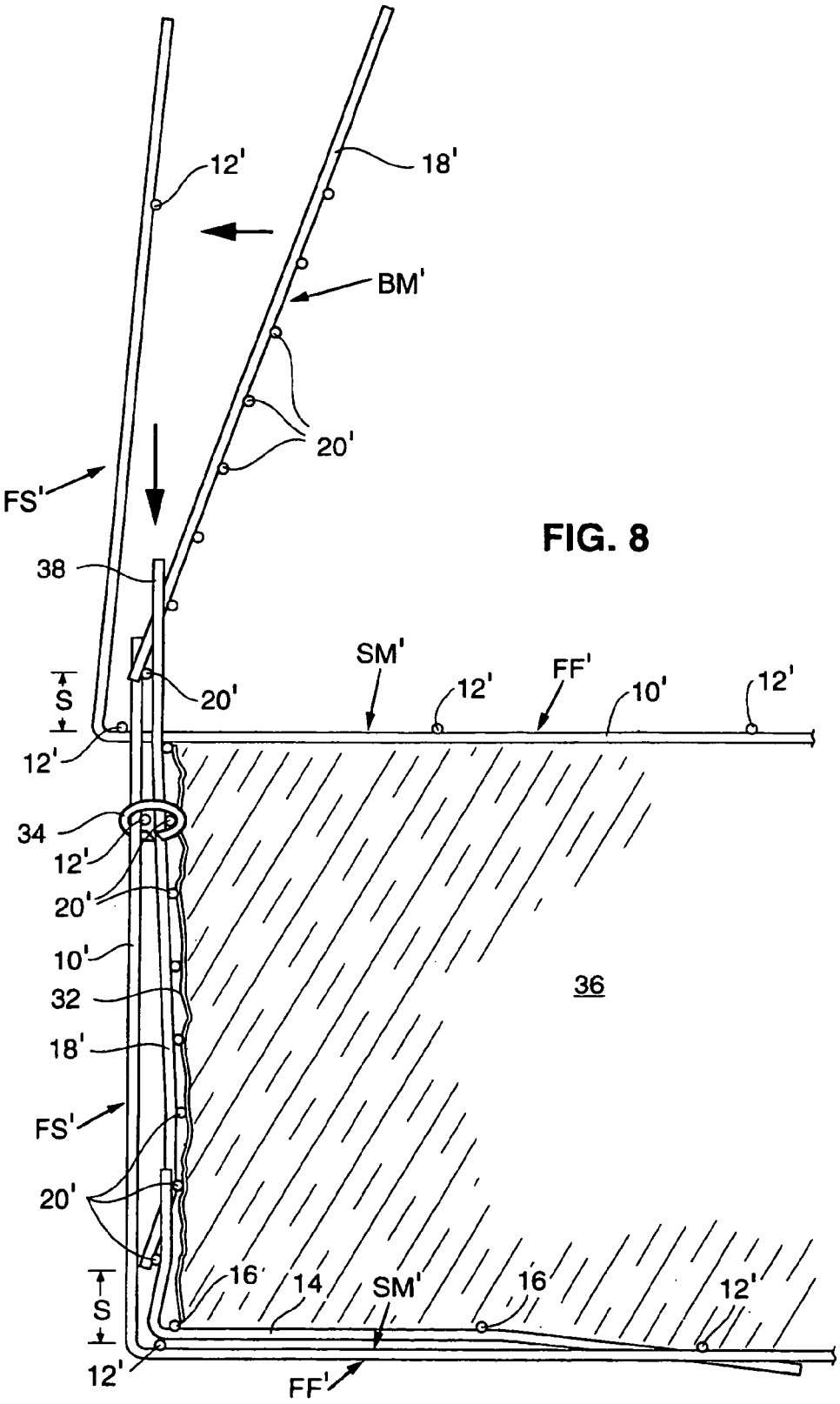
FIG. 8 is an elevational view similar to FIG. 7, illustrating backfill in place in the first lift and the components of the second lift in the process of being assembled.

FIG. 8 shows the manner in which the second lift of the second embodiment is erected over the first lift, after fill soil 36 has been placed in the first lift. The first step of such erection is to place the second lift soil reinforcing mat SM' over the fill 36 with the transverse wire 12' at the juncture of the floor section FF' and face section FS' to the forward side of the longitudinal wires 10' of the lower lift face section FS'. So positioning the second lift soil reinforcing mat SM serves to hold the longitudinal wires 10' of the face section FS' of the lower lift against outward displacement. The next step of assembly for the second lift is to thread the distal ends 38 of the lower lift soil reinforcing mat SM' between the lowermost transverse wires 20' of the second lift backing mat BM'. The latter step is carried out so that a dimension "s" of about three inches is provided between the floor section FF' of the second lift and the lower extremity of the backing mat BM' of the second lift.

Assembly of the second lift is completed by swinging the backing mat BM' in the direction of the horizontal arrow line shown in FIG. 8 and then securing the backing mat BM' and face section FS' of the second lift together with a hog ring 34 (not illustrated). A filter mat 32 is then placed behind the backing mat BM' of the second lift and fill 36 is then backfilled into place to the level of the uppermost transverse wire 20' of the second lift backing mat BM'.

Like the first embodiment, successive lifts are assembled over the second lift of the second embodiment until the wall reaches it desired height, with the uppermost lift being construction through use of a top reinforcing mat TR and a top mat TM. In assembly of the top most lift, the backing mat BM of that lift is threaded over the distal ends 38 of the backing mat BM' of the lift immediately therebelow. As with all lifts of the second embodiment wall, the backing mat BM of the top lift is assembled so as to be spaced above the floor section TF by a dimension of approximately three inches.

Settling of the second embodiment wall as the result of the compaction of the fill therein is accommodated similarly to that of the first embodiment wall. In this process, the backing mats BM' may slide vertically on the distal ends 38 over the dimension "s" for each lift, without bulging of the face of the wall. At the same time, the face section FS' of each successive lift holds the face section of the lift therebelow through means of the transverse wire 12' at the intersection of the face section FS' and floor section FF' of the next successive lift.

From the foregoing description and accompanying drawings, it is believed apparent that the present invention enables the attainment of the objects initially set forth herein. In particular, it provides a soil reinforced retaining wall wherein successive lifts may settle, without bulging of their face sections. Such settlement is accommodated by supporting the soil reinforcing mats of successive lifts on the backing mats of the lifts therebelow and permitting these backing mats to settle through means of a slidable connection. It should be understood, however, the invention is not intended to be limited to the specifics of the illustrated embodiments, but rather is defined by accompanying claims.

We claim:

1. A soil reinforced retaining wall for an earthen formation, comprising:

a) a plurality of welded wire soil reinforcing mats successively embedded in the formation one above the other in generally horizontal spaced relationship, each mat having a generally horizontal floor comprised of a gridwork of wires and a face comprised of generally vertically extending wires wherein the wires of the face of each mat are held against horizontal displacement by the reinforcing mat thereabove and are free to move vertically relative thereto; and, b) a welded wire backing mat disposed behind the vertically extending wires of the face of each reinforcing mat for movement relative thereto in a generally vertical plane, each backing mat having an element for supporting engagement with the next successive reinforcing mat thereabove and being spaced from the floor of the reinforcing mat therefor to permit the next successive reinforcing mat to settle to accommodate settling of the earthen formation.

2. A soil reinforced retaining wall according to claim 1 wherein the vertically extending wires of the face of each reinforcing mat are held against horizontal displacement by engagement with a cross-wire of the next successive mat thereabove.

3. A soil reinforced retaining wall according to claim 1 further comprising a connector between the face of each soil reinforcing mat and the backing mat therebehind to provide limited restraint to the backing mat against vertical movement relative to the face.

4. A soil reinforced mat according to claim 3 wherein the connector comprises a one or more hog-rings connected between the backing mat and the face of the reinforcing mat.

5. A soil reinforced retaining wall according to claim 4 wherein:

a) the face of each reinforcing mat has a wire extending transversely of the vertically extending wires of the mat; and, b) the hog rings are connected between the backing mat and the transversely extending wire.

6. A soil reinforced retaining wall according to claim 1 wherein the generally vertically extending wires of the face of each reinforcing mat have distal ends which extend through the next successive reinforcing mat thereabove to restrain the backing mat behind said next successive reinforcing mat against horizontal displacement.

7. A soil reinforced retaining wall according to claim 1 wherein the backing mats have vertically extending wires with free distal ends which extend through the next successive reinforcing mat thereabove to restrain the backing mat behind said next successive reinforcing mat against horizontal displacement.

8. A soil reinforced retaining wall according to claim 1 wherein a welded wire stiffener mat is disposed over a lowermost soil reinforcing mat, said stiffener mat having a turned-up distal end to restrain the backing mat disposed behind the face of said lowermost reinforcing mat against horizontal displacement.

9. A method of constructing a soil reinforced retaining wall for an earthen formation, comprising:

a) embedding a plurality of welded wire soil reinforcing mats in the formation in generally horizontal spaced relationship to one another so that each mat has a generally horizontal floor comprised of a gridwork of wires and a face comprised of generally vertically extending wires wherein the wires of the face of each reinforcing mat are held against horizontal displacement by the mat thereabove and are free to move vertically relative thereto; and, b) positioning a welded wire backing mat behind the vertically extending wires of the face of each reinforcing mat for movement relative thereto in a generally vertical plane, each backing mat being disposed for supporting engagement with the next successive reinforcing mat thereabove and being spaced from the floor of the reinforcing mat therefor to permit the next successive reinforcing mat to settle to accommodate settling of the earthen formation.

10. A method according to claim 9 wherein the vertically extending wires of the face of each reinforcing mat are held against horizontal displacement by engagement with a cross-wire the next successive mat thereabove.

11. A method according to claim 9 further comprising connecting the face of each soil reinforcing mat and the backing mat therebehind to provide limited restraint to the backing mat against vertical movement relative to the face.

12. A method according to claim 11 wherein the step of connecting is provided by one or more hog-rings connected between the backing mat and the face of the reinforcing mat.

13. A method according to claim 12 wherein:

a) the face of each reinforcing mat has a wire extending transversely of the vertically extending wires of the mat; and, b) the hog rings are connected between the backing mat and the transversely extending wire.

14. A method according to claim 9 further comprising extending the vertically extending wires of the face of each soil reinforcing mat to provide distal ends which extend through the next successive reinforcing mat thereabove to restrain the backing mat behind said next successive reinforcing mat against horizontal displacement.

15. A method according to claim 9 further comprising providing vertically extending wires on the backing mat with free distal ends which extend through the next successive reinforcing mat thereabove to restrain the backing mat behind said next successive reinforcing mat against horizontal displacement.

16. A method according to claim 9 further comprising positioning a welded wire stiffener mat over a lowermost soil reinforcing mat to restrain the backing mat disposed behind the face of said lowermost reinforcing mat against horizontal displacement.

17. A soil reinforced retaining wall for an earthen formation, comprising:

a) first and second welded wire soil reinforcing mats embedded in the formation in generally [horizontally] *horizontal* spaced relationship with the second mat being disposed above the first mat and the first mat having a face extending upwardly from one end thereof toward the second mat; and, b) support means carried by the face of the first mat and disposed for supporting engagement with the second mat, said means being movable relative to the face to permit the second mat to move vertically relative to the first mat to accommodate settling of the earthen formation without bulging of the face.

18. A soil reinforced retaining wall according to claim 17 wherein the face has one side facing the earthen formation and the support means comprises a welded wire backing mat for said face to the side thereof facing the formation.

19. A soil reinforced retaining wall according to claim 18 wherein the backing mat is releasably secured to the face.

*20. A soil reinforced retaining wall for an earthen formation comprising:*

*a) first and second welded wire soil reinforcing mats embedded in the formation in generally horizontal spaced relationship, with the second mat being disposed above the first mat;*

*b) a face secured to and extending upwardly from one end of the first mat and toward the second mat; and,*

*c) support means carried by the face and disposed for supporting engagement with the second mat, said means being movable relative to the face to permit the second mat to move vertically relative to the first mat to accommodate settling of the earthen formation without bulging of the face.*

*21. A soil reinforced retaining wall for an earthen formation comprising:*

*a) first and second welded wire soil reinforcing mats embedded in the formation in generally horizontal spaced relationship, with the second mat being disposed above the first mat;*

*b) a face secured to and extending upwardly from one end of the first mat and toward the second mat; and,*

*c) support means carried by the face and disposed for supporting engagement with the second mat, said means being movable relative to the face and permitting the second mat to move vertically relative to the first mat to accommodate settling of the earthen formation without bulging of the face.*

* * * * *